(12) United States Patent
Konami

(10) Patent No.: US 9,665,273 B2
(45) Date of Patent: *May 30, 2017

(54) INFORMATION PROCESSING TERMINAL AND METHOD, PROGRAM, AND RECORDING MEDIUM

(71) Applicant: Sony Corporation, Tokyo (JP)

(72) Inventor: Shuichi Konami, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,274

(22) Filed: Feb. 5, 2016

(65) Prior Publication Data

US 2016/0170634 A1 Jun. 16, 2016

Related U.S. Application Data

(63) Continuation of application No. 14/123,725, filed as application No. PCT/JP2012/003566 on May 31, 2012.

(30) Foreign Application Priority Data

Jun. 7, 2011 (JP) .................................. 2011-127335

(51) Int. Cl.
G06F 9/44 (2006.01)
G06F 3/0488 (2013.01)
G06F 3/01 (2006.01)

(52) U.S. Cl.
CPC .......... *G06F 3/04883* (2013.01); *G06F 3/017* (2013.01); *G06F 3/04886* (2013.01); *G06F 9/4446* (2013.01); *G06F 2203/04803* (2013.01)

(58) Field of Classification Search
CPC ...... G06F 3/041; G06F 3/0416; G06F 3/0412; G06F 3/0488; G06F 3/044
See application file for complete search history.

(56) References Cited

U.S. PATENT DOCUMENTS 5,283,560 A * 2/1994 Bartlett ................. G06F 3/0481
345/902
6,459,442 B1 10/2002 Edwards et al.
(Continued)

FOREIGN PATENT DOCUMENTS

| CN | 101227669 | 7/2008 | |
|---|---|---|---|
| CN | 101620511 | 1/2010 | |
| EP | 0 597 379 A2 * | 11/1993 | ............. G06F 15/20 |

(Continued)

OTHER PUBLICATIONS

Office Action issued in corresponding Chinese Application No. 201280026594.2 issued Mar. 3, 2016 and its English Translation.
(Continued)

*Primary Examiner* — Olga Merkoulova
(74) *Attorney, Agent, or Firm* — Haug Partners LLP; William S. Frommer

(57) ABSTRACT

A device comprising:
a display unit displays display screens;
an input unit receives a gesture input;
a controller detects whether a gesture, input on said input unit, is in a gesture input region where gesture input is accepted on one of the display screens of the display unit, and displays gesture input regions for the display screen when the gesture is not detected in the gesture input region.

13 Claims, 14 Drawing Sheets

(56) References Cited

U.S. PATENT DOCUMENTS

| | | | | |
|---|---|---|---|---|
| 2010/0192103 A1* | 7/2010 | Cragun | ............... | G06F 3/04817 715/834 |
| 2010/0306702 A1* | 12/2010 | Warner | ................. | G06F 3/0482 715/811 |

FOREIGN PATENT DOCUMENTS

| | | |
|---|---|---|
| EP | 0597379 | 5/1994 |
| JP | 6-242885 | 9/1994 |
| JP | 6-266494 | 9/1994 |
| JP | H6-289984 | 10/1994 |
| JP | 8-286831 | 11/1996 |
| JP | 9-230992 | 9/1997 |
| JP | 10-91346 | 4/1998 |
| JP | 10-105325 | 4/1998 |
| JP | 2000-137555 | 5/2000 |
| JP | 2002-259002 | 9/2002 |
| JP | 2003-196593 | 7/2003 |
| JP | 2004-78815 | 3/2004 |
| JP | 2005-339420 | 12/2005 |
| JP | 2006-99468 | 4/2006 |
| JP | 2008-209641 | 9/2008 |
| JP | 2008-282092 | 11/2008 |
| JP | 2010-15238 | 1/2010 |
| JP | 2011-70474 | 4/2011 |
| JP | 2011-215824 | 10/2011 |
| WO | WO 2011/037149 | 3/2011 |

OTHER PUBLICATIONS

Youtube video, "How to delete applications from the phone 3G", http://youtube.com/watch?v=IpObYiDjmHw loaded on Jul. 16, 2008.

Office Action issued in corresponding Chinese Application No. 2016-000116 issued Dec. 6, 2016.

* cited by examiner

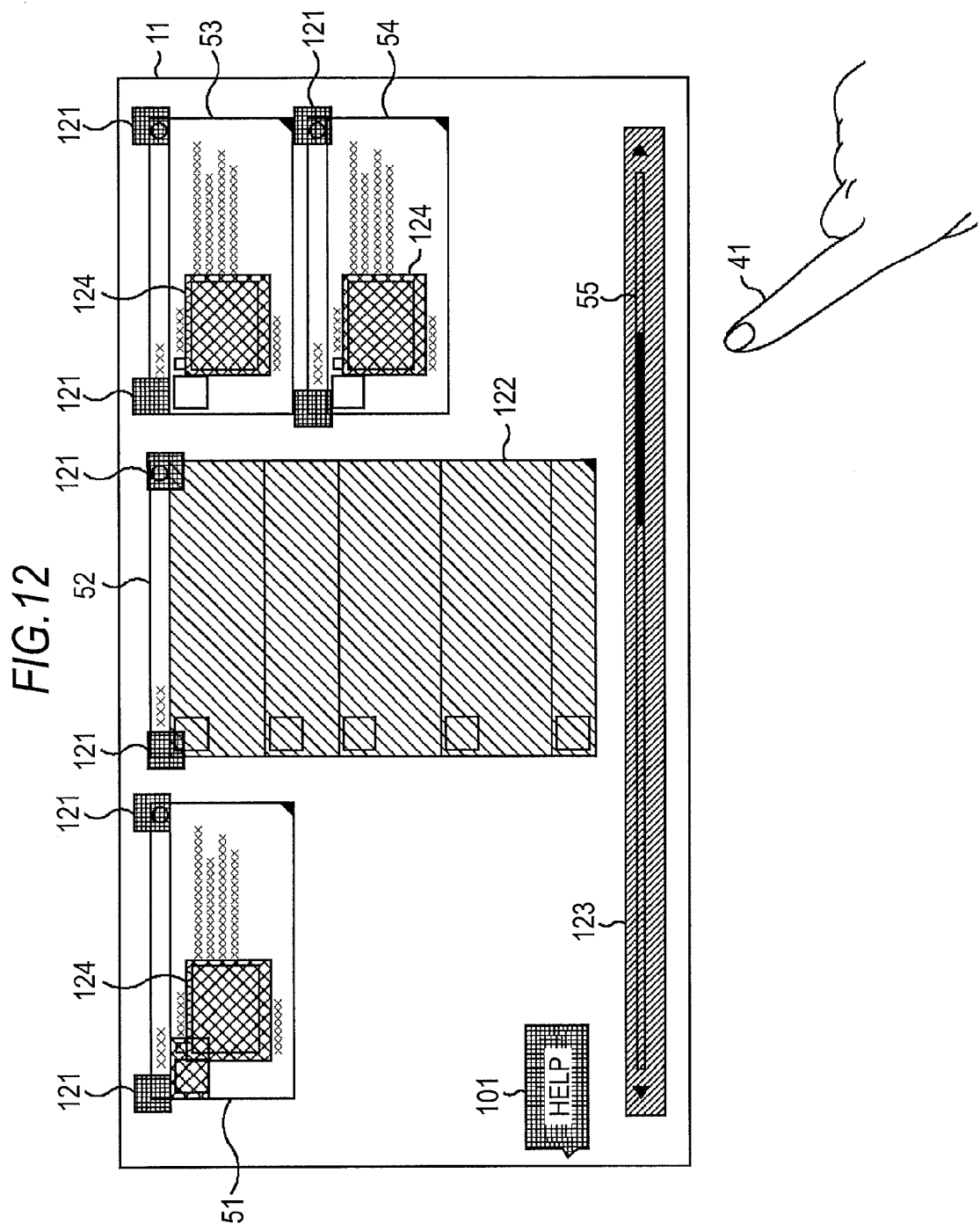

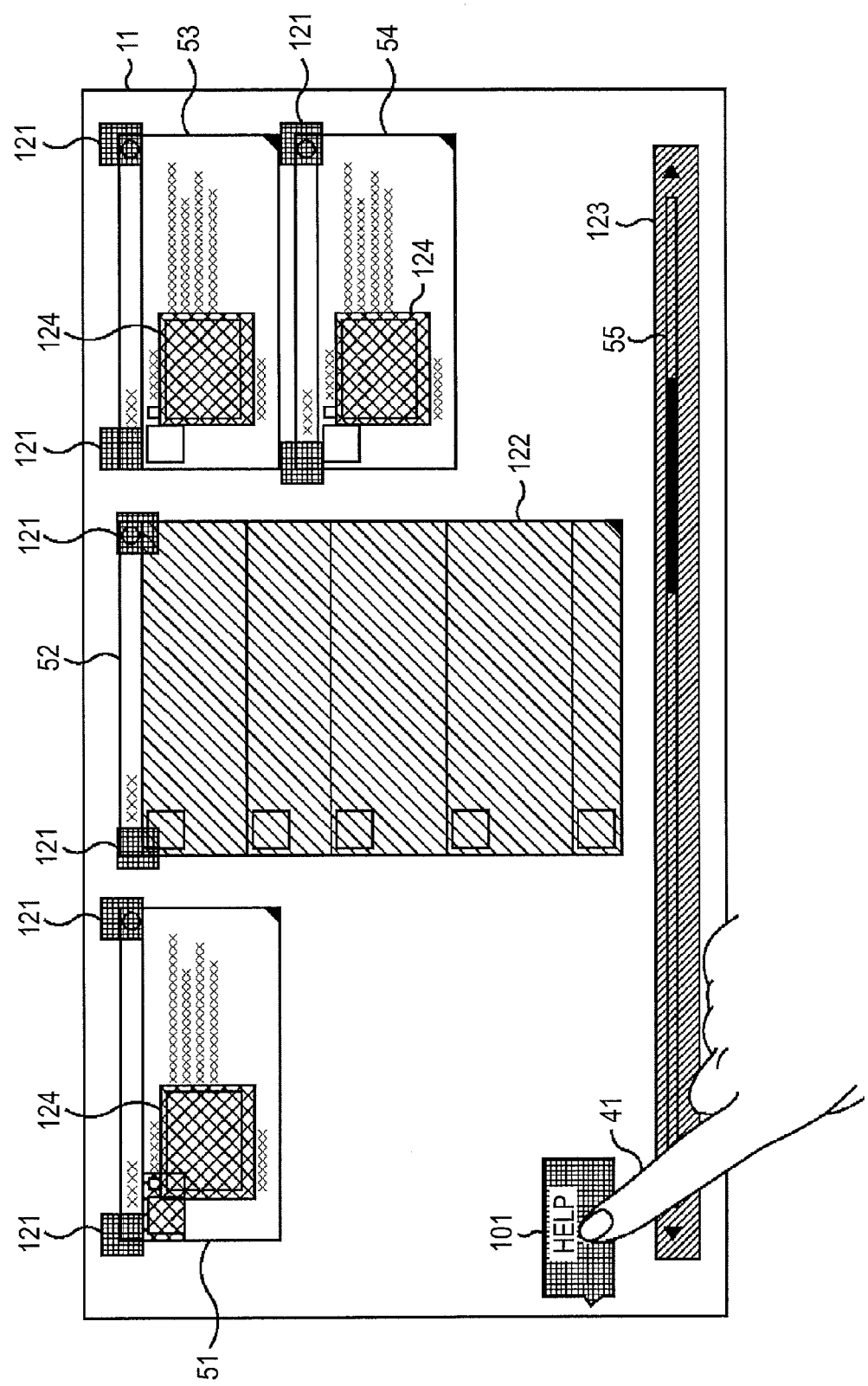

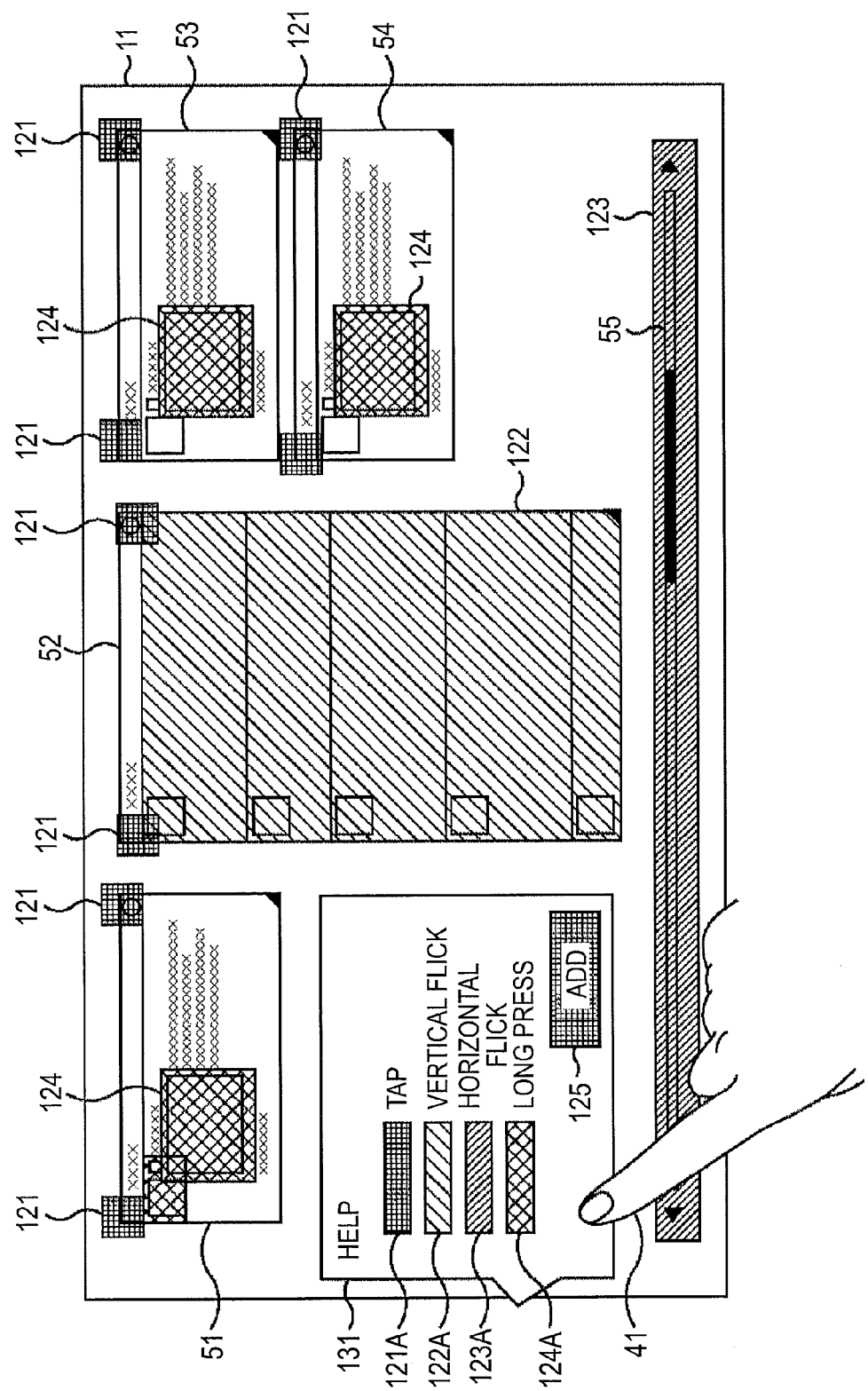

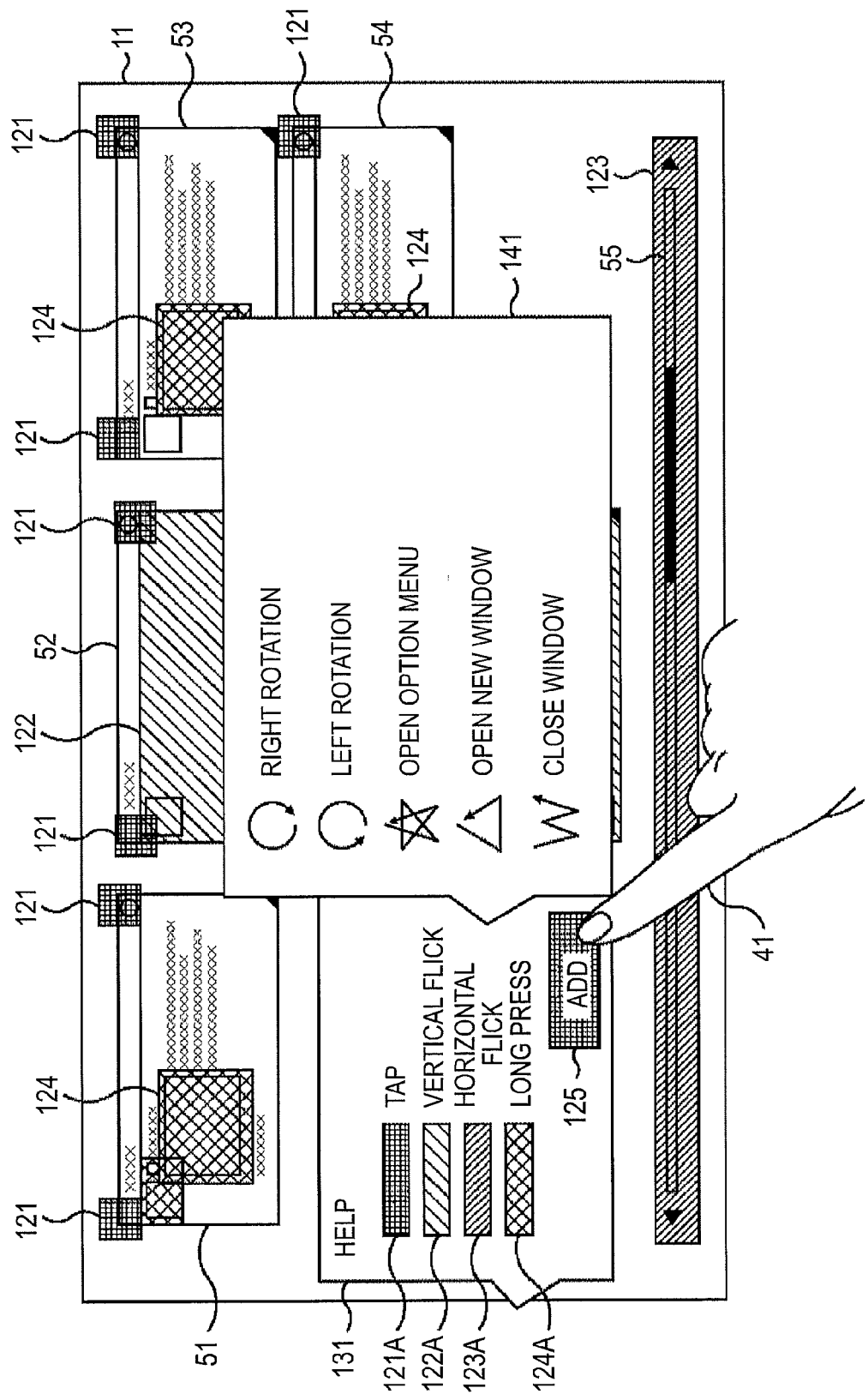

INFORMATION PROCESSING TERMINAL AND METHOD, PROGRAM, AND RECORDING MEDIUM

This is a continuation of application Ser. No. 14/123,725, filed Dec. 3, 2013, which is a 371 of International Application number PCT/JP2012/003566, filed May 31, 2012, which is entitled to the priority filing date of Japanese application 2011-127335, filed Jun. 7, 2011, the entirety of which is incorporated herein by reference.

TECHNICAL FIELD

The present technology relates to an information processing terminal and method, a program, and a recording medium. In particular, the present technology relates to an information processing terminal and method, a program, and a recording medium allowing a gesture to be reliably input.

BACKGROUND ART

With the spread of information processing terminals, such as smartphones or tablet terminals having a touch panel mounted therein, interfaces which are operable with gestures are increasingly used. When a user inputs a gesture, the information processing terminal recognizes the gesture, and performs a process associated with the recognized gesture.

An information processing terminal is known in which, since there are various types of inputs of gestures, a menu is displayed to guide inputtable gestures to a user (for example, see PTL 1).

CITATION LIST

Patent Literature

[PTL 1] JP-A-2005-339420

SUMMARY

Technical Problem

However, various kinds of information are displayed simultaneously on the information processing terminal. For this reason, the user may input a gesture at an incorrect position. In this case, even when a correct gesture is input, the input is not received. Accordingly, the user may erroneously recognize that the apparatus is out of order.

Thus, it is therefore desirable to allow a gesture to be reliably input.

Solution to Problem

A device comprising:
a display unit displays display screens;
an input unit receives a gesture input;
a controller detects whether a gesture, input on said input unit, is in a gesture input region where gesture input is accepted on one of the display screens of the display unit, and displays gesture input regions for the display screen when the gesture is not detected in the gesture input region.

A method comprising the steps of:
detecting whether a gesture, input on an input unit, is in a gesture input region where gesture input is accepted on a display screen of a display unit; and
displaying gesture input regions for the display screen when the gesture is not detected in the gesture input region.

A program, embodied on a non-transitory computer readable medium, executed on a computer for determining gestures comprising the steps of:
detecting whether a gesture, input on an input unit, is in a gesture input region where gesture input is accepted on a display screen of a display unit; and
displaying gesture input regions for the display screen when the gesture is not detected in the gesture input region.

A non-transitory computer-readable recording medium for controlling a controller to determine gestures comprising the steps of:
detecting whether a gesture, input on an input unit, is in a gesture input region where gesture input is accepted on a display screen of a display unit; and
displaying gesture input regions for the display screen when the gesture is not detected in the gesture input region.

Advantageous Effects

According to the embodiments of the present technology, it is possible to allow a gesture to be reliably input.

BRIEF DESCRIPTION OF DRAWINGS

FIG. 12 is a diagram showing a display example when an inputtable region display process is performed.

FIG. 13 is a diagram showing a display example when an inputtable region display process is performed.

FIG. 14 is a diagram showing a display example when an inputtable region display process is performed.

FIG. 15 is a diagram showing a display example when an inputtable region display process is performed.

DESCRIPTION OF EMBODIMENTS

Hereinafter, embodiments of the present technology will be described. Description will be provided in the following sequence.

1. First Embodiment (gesture input correction function)
2. Second Embodiment (inputtable region display function)

First Embodiment

A gesture input correction function which is a function of, when a gesture input by a user is not recognizable, displaying an option and correcting a gesture will be described first.

[Appearance of Information Processing Terminal]

Figure 1:
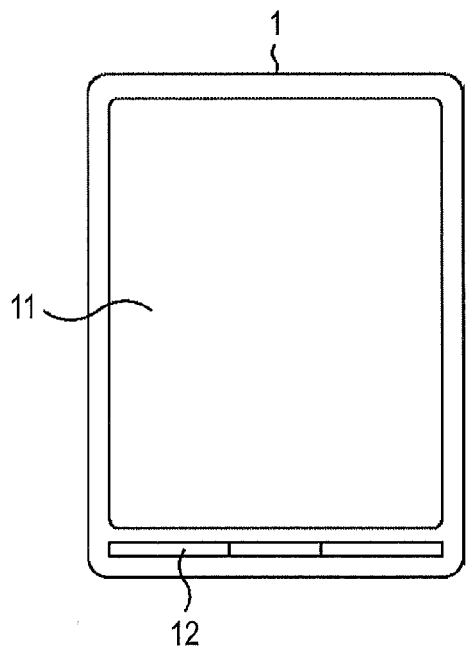
FIG. 1 is a diagram showing an example of the appearance of an information processing terminal according to an embodiment of the present technology.

FIG. 1 is a diagram showing an example of the appearance of an information processing terminal according to an embodiment of the present technology.

An information processing terminal 1 of FIG. 1 is a portable terminal, such as a smartphone, a mobile phone, a PDA (Personal Digital Assistants), or a PND (Portable Navigation Device), and has a housing of a size such that a user can carry the terminal in one hand.

A display unit 11 having an LCD (Liquid Crystal Display) or the like is provided in the front surface of the housing of the information processing terminal 1. A touch panel 25 is provided on the upper surface of the display unit 11. The user can directly operate the touch panel 25 at a position corresponding to information displayed on the display unit 11 with his/her finger or the like. An operation unit 12 having a plurality of buttons is provided below the display unit 11.

[Configuration Example of Information Processing Terminal]

Figure 2:
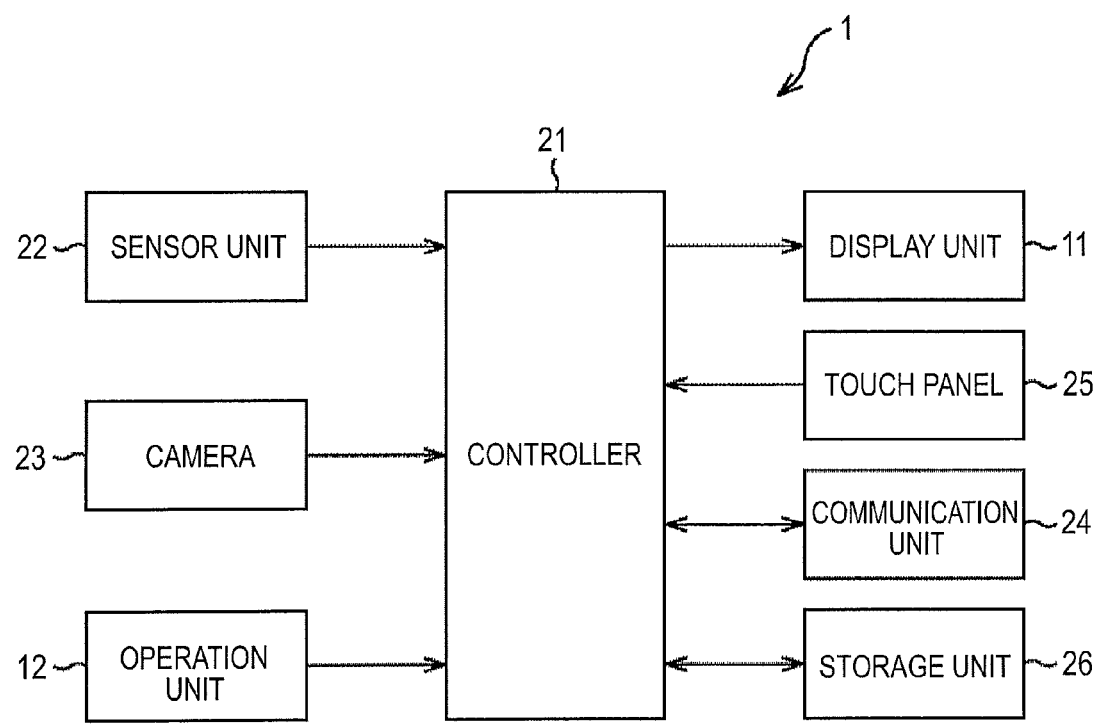
FIG. 2 is a block diagram showing an electrical configuration example of an information processing terminal.

FIG. 2 is a block diagram showing an electrical configuration example of the information processing terminal 1.

The information processing terminal 1 has a configuration in which, in addition to the display unit 11 and the operation unit 12, a sensor unit 22, a camera 23, a communication unit 24, the touch panel 25, and a storage unit 26 are connected to a controller 21.

The controller 21 has a CPU (Central Processing Unit), a ROM (Read Only Memory), a RAM (Random Access Memory) (not shown), and the like. The CPU of the controller 21 loads a program from the ROM and executes the program using the RAM to control the overall operation of the information processing terminal 1.

The sensor unit 22 has a gyro sensor or the like, and detects a movement in the information processing terminal 1. The sensor unit 22 outputs information regarding the detected movement to the controller 21.

The camera 23 has an imaging device, such as a CMOS (Complementary Metal Oxide Semiconductor) image sensor. The camera 23 performs photoelectric conversion on light introduced by a lens (not shown) provided in the front surface of the housing of the information processing terminal 1 and generates image data. An image captured by the camera 23 is supplied to the controller 21.

The communication unit 24 performs communication with an apparatus on a network, such as a LAN (Local Area Network) or Internet. For example, information of a Web page or the like received by the communication unit 24 is displayed on the display unit 11.

The transparent touch panel 25 is provided on the upper surface of the display unit 11, and detects an operation of the user's finger or the like. The storage unit 26 has a nonvolatile memory, a hard disk, or the like, and stores a program which is executed by the controller 21, data, or the like.

Figure 3:
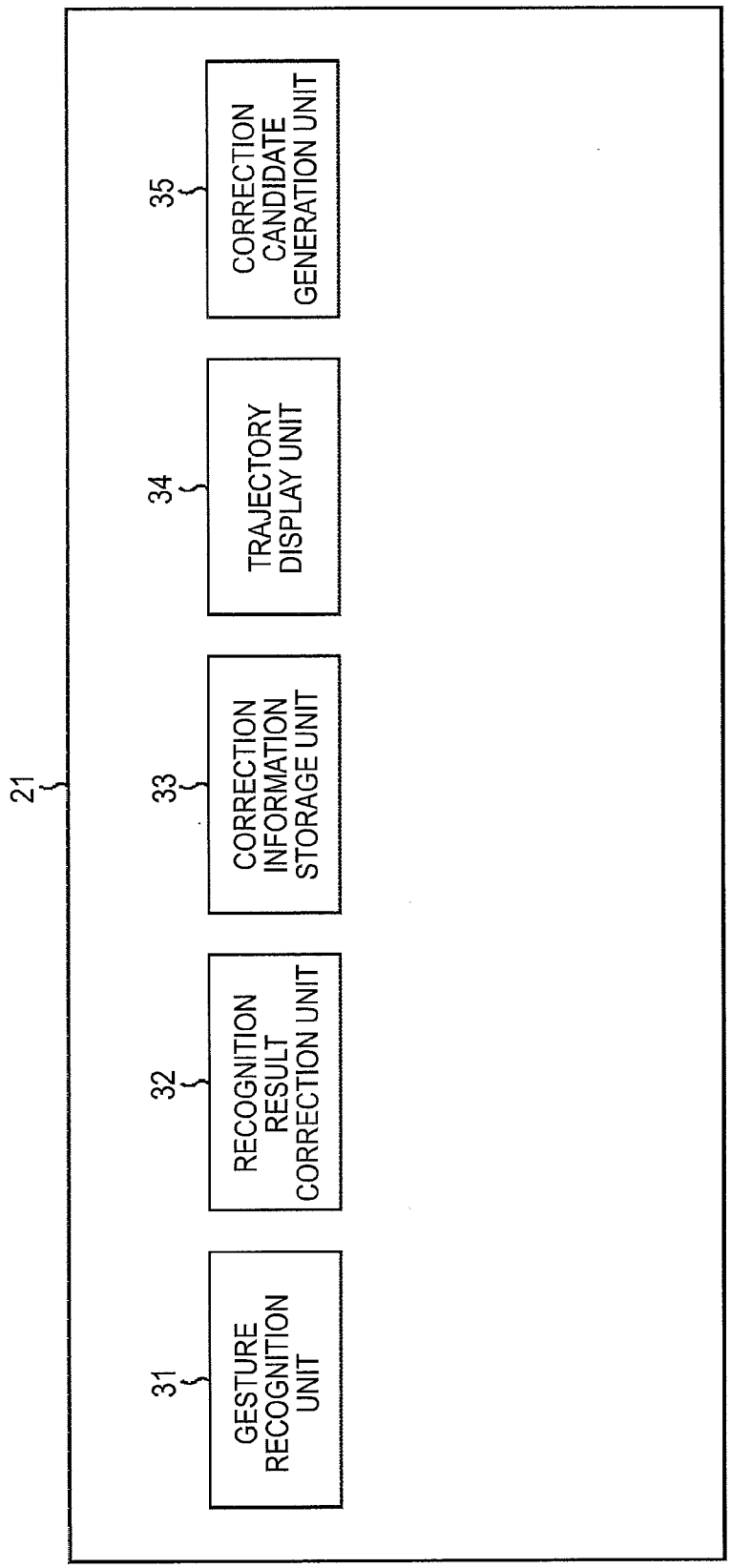
FIG. 3 is a block diagram showing a functional configuration example of a controller.

FIG. 3 is a block diagram showing a functional configuration example of the controller 21. At least some of the functional units shown in FIG. 3 are realized by a predetermined program which is executed by the controller 21 of FIG. 2.

In FIG. 3, the controller 21 includes a gesture recognition unit 31, a recognition result correction unit 32, a correction information storage unit 33, a trajectory display unit 34, and a correction candidate generation unit 35.

The gesture recognition unit 31 generates a gesture which is input when the user traces the touch panel 25 with his/her finger. Examples of the gesture include, in addition to the above-described trace operation, a plurality of operations. For example, examples of the gesture include a tap operation in which the user lightly touches the touch panel 25 once, and a double tap operation in which the user lightly touches the touch panel 25 twice. There is also a flick operation in which the user sweeps the touch panel 25 in an arbitrary direction with his/her finger 41 (see FIG. 4 described below), or the like. Examples of the gesture also include an operation in which the finger 41 of the user draws a figure, such as a circle or a triangle, on the touch panel 25.

The gesture recognition unit 31 recognizes a process associated with the detected gesture from among the processes which are performed by the information processing terminal 1. That is, when there is no process associated with the detected gesture, the gesture recognition unit 31 determines that the gesture is an unrecognizable gesture.

The gesture recognition unit 31 performs a process associated with the recognized gesture.

The recognition result correction unit 32 performs a process for requesting the user to correct the gesture which is unrecognizable by the gesture recognition unit 31. Specifically, for example, a gesture which is recognizable on a screen to which the user inputs a gesture, or another gesture which is close to the gesture input by the user is displayed on the display unit 11 as an option. For example, when a region where the user inputs a gesture, in response to an image of the display unit 11, is a region where the gesture is unrecognizable, the recognition result correction unit 32 displays another region where the input of the gesture is possible.

When the user inputs an unrecognizable gesture, the correction information storage unit 33 stores the unrecognizable gesture in association with a gesture selected by the user as correction information. The correction information storage unit 33 repeatedly stores correction information each time an unrecognizable gesture is detected. The gesture recognition unit 31 learns the gesture of the user on the basis of the correction information stored in the correction information storage unit 33. The correction information storage unit 33 also stores an ID (Identification) for specifying an application being displayed on the display unit 11 and an ID for specifying a screen in association with a gesture.

The trajectory display unit 34 displays the trajectory of a gesture recognized by the gesture recognition unit 31 on the display unit 11. The trajectory display unit 34 also creates an animation where the trajectory of the gesture is reduced to a predetermined size, and displays the gesture of a predetermined size on the display unit 11 as a reduced trajectory. The reduced trajectory will be described below with reference to FIG. 7.

The correction candidate generation unit 35 generates a candidate for a recognizable gesture on a screen to which the user inputs a gesture or a gesture close to an unrecognizable gesture as an option with reference to an ID for specifying an application being displayed on the display unit 11 and an ID for specifying a screen stored in the correction information storage unit 33. The correction candidate generation unit 35 detects a region where a gesture input is possible from an image displayed on the display unit 11 with reference to an ID for specifying an application being displayed on the display unit 11 and an ID for specifying a screen stored in the correction information storage unit 33.

Figure 4:
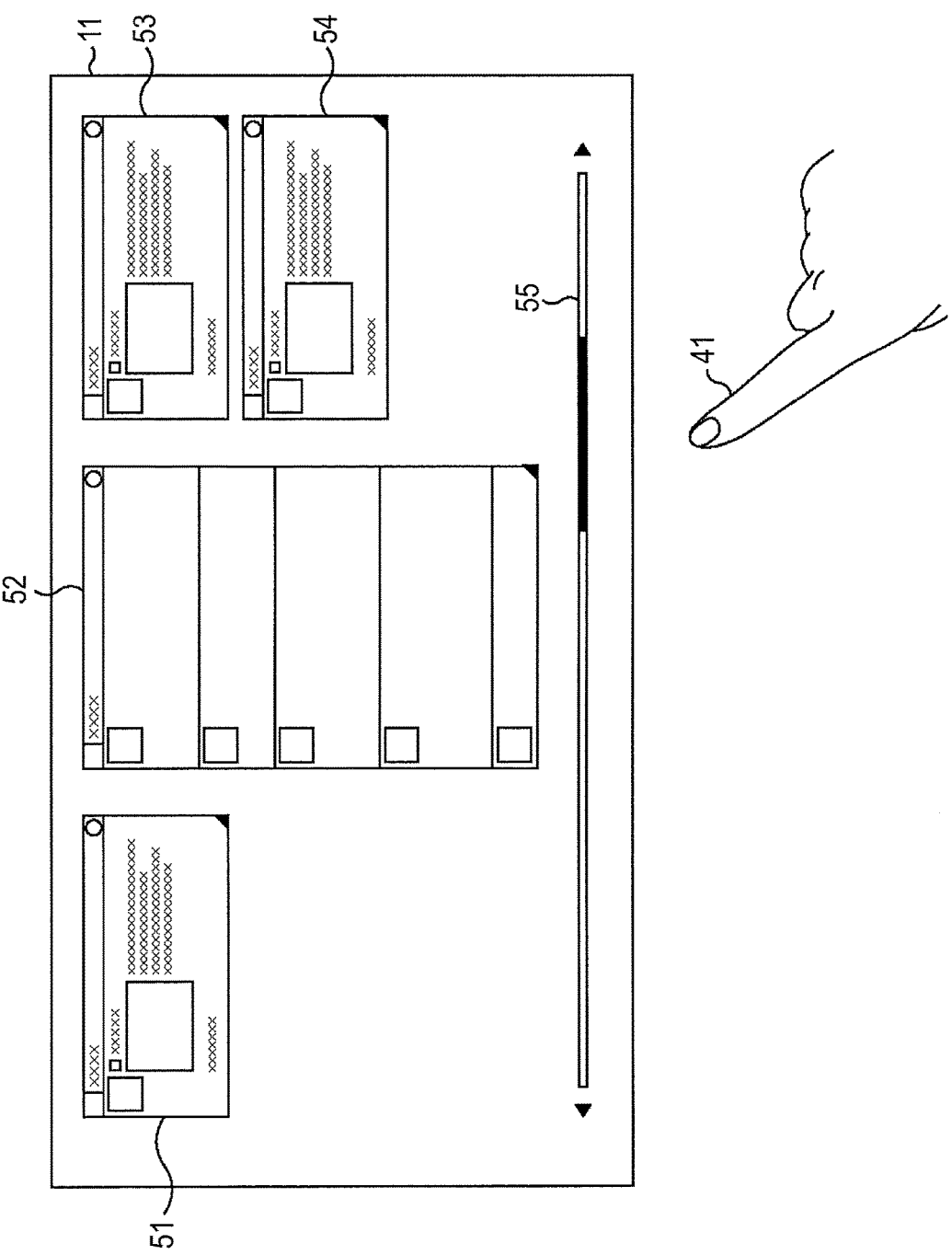
FIG. 4 is a diagram showing a display example of a display unit.

FIG. 4 is a diagram showing a display example of the display unit 11. As described above, the transparent touch panel 25 is provided on the upper surface of the display unit 11, such that the user visually recognizes information displayed on the display unit 11 through the touch panel 25, and directly operates information with finger 41 or the like.

The user's finger 41 inputs a gesture to the touch panel 25. The user touches the touch panel 25 with finger 41 and conducts various operations on the touch panel 25 to input a gesture. In the following description, for simplification of description, if necessary, it will be described that "a gesture is input to the display unit 11".

Display regions 51 to 54 are windows displayed on the display unit 11. In each of the display regions 51 to 54, an image corresponding to content or an application is displayed.

A scroll bar 55 can move an image displayed on the display unit 11 right or left. That is, the user flicks in the horizontal direction on the scroll bar 55, thereby moving an image displayed on the display unit 11 right or left.

Figure 5:
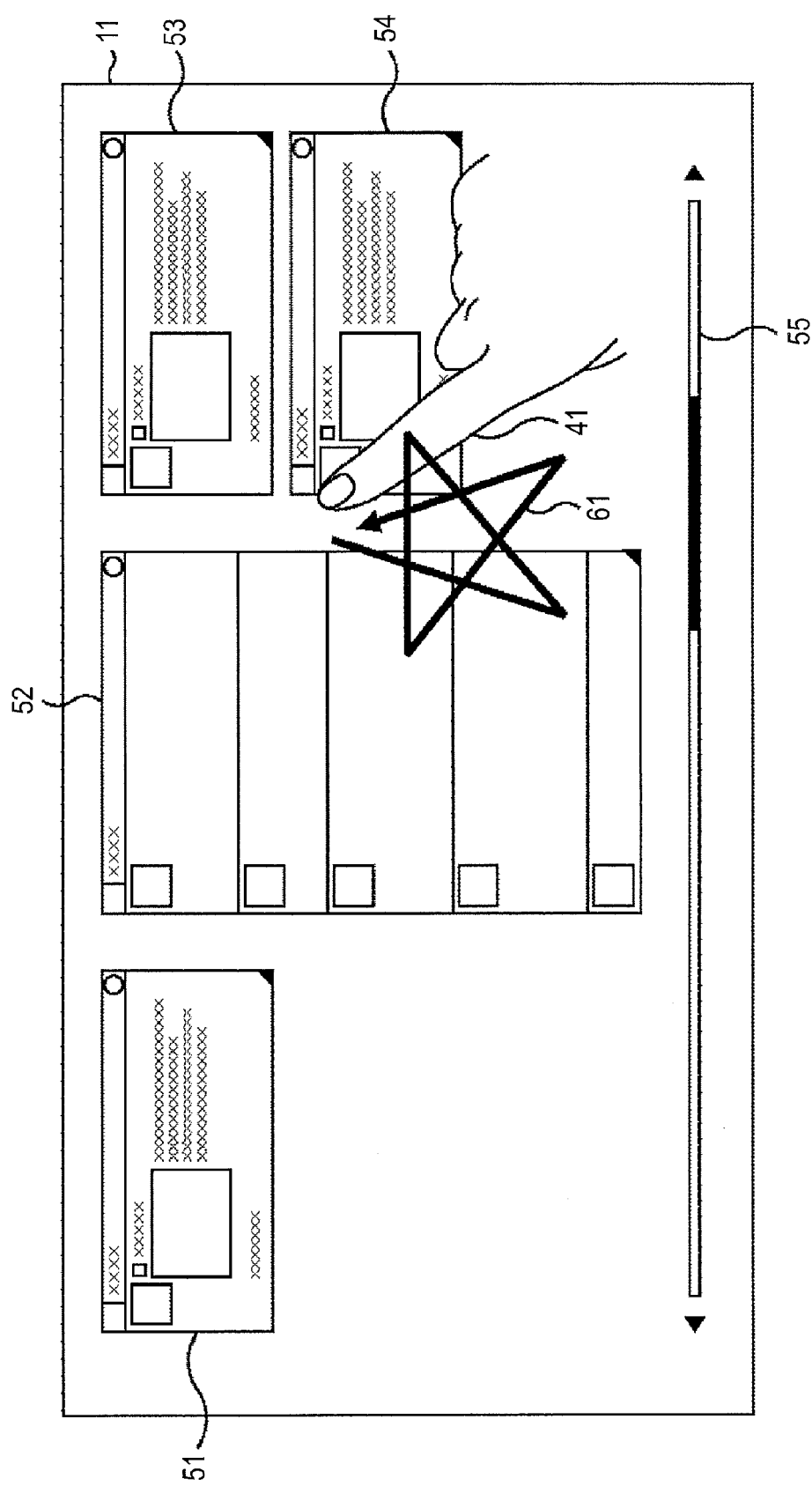
FIG. 5 is a diagram showing an example of a gesture input.

FIG. 5 is a diagram showing an example of a gesture input. If the user inputs a gesture (hereinafter, referred to as gesture (star)) for drawing a star on the display unit 11 with finger 41, the gesture recognition unit 31 recognizes the gesture by finger 41 as a gesture (star). The trajectory of finger 41 recognized by the gesture recognition unit 31 is displayed at a position of the display unit 11 where the gesture is input with finger 41 as a gesture trajectory 61 by the trajectory display unit 34. The gesture recognition unit 31 performs a process (for example, "open option menu" or the like) associated with the input gesture (star).

[Operation of Information Processing Terminal]

Figure 6:
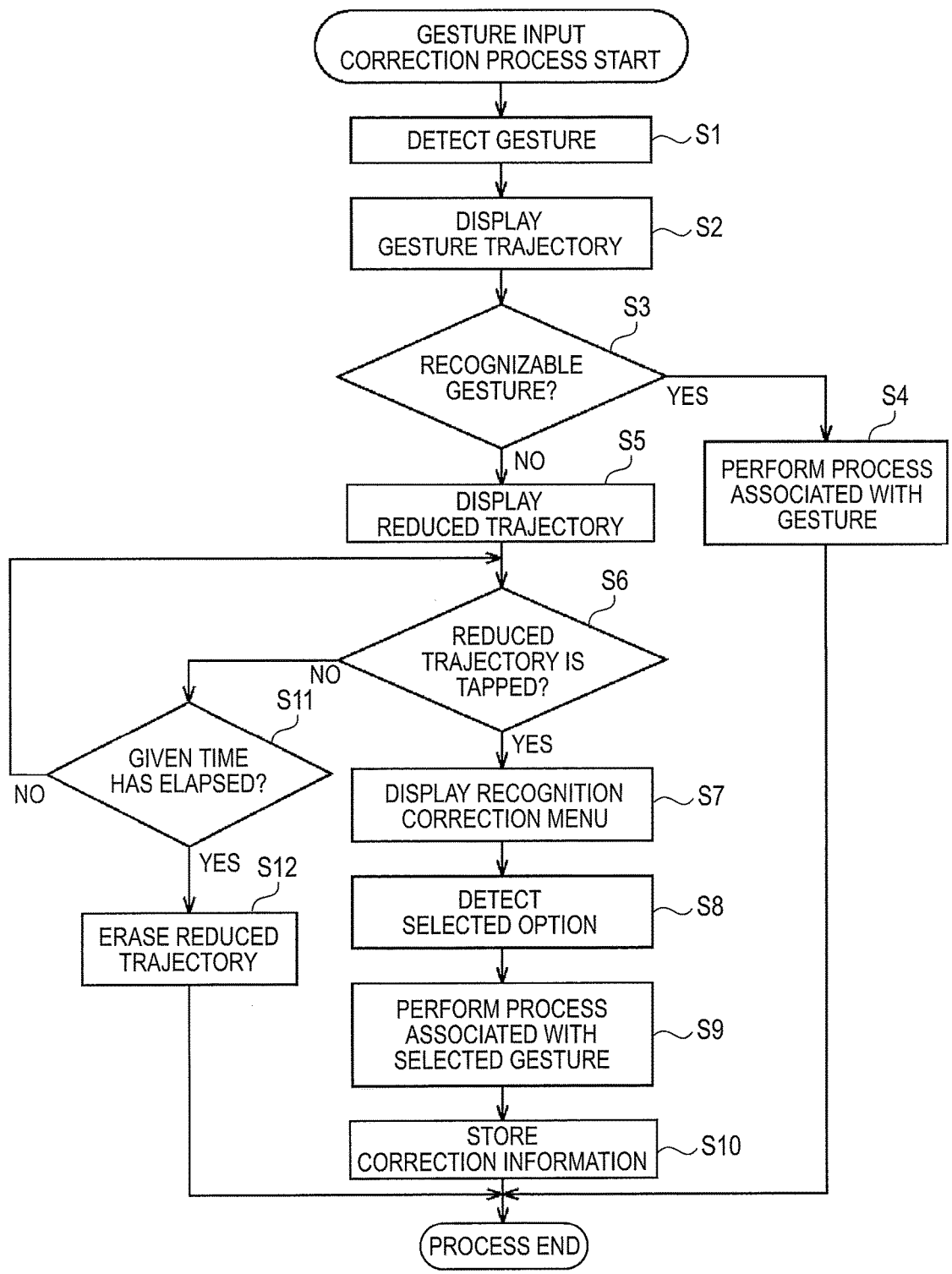
FIG. 6 is a flowchart illustrating a gesture input process.

FIG. 6 is a flowchart illustrating a gesture input process. The gesture input process is a process which is performed by the controller 21 when the user inputs a gesture to the display unit 11.

FIGS. 7 to 10 are diagrams showing a display example when the gesture input process is performed. Hereinafter, the process of the flowchart of FIG. 6 will be described with reference to FIGS. 7 to 10.

In Step S1, the gesture recognition unit 31 detects a gesture. Specifically, in FIG. 7, the gesture recognition unit 31 detects a gesture which is input to the display unit 11 with finger 41. That is, the trajectory of the gesture is detected.

Figure 7:
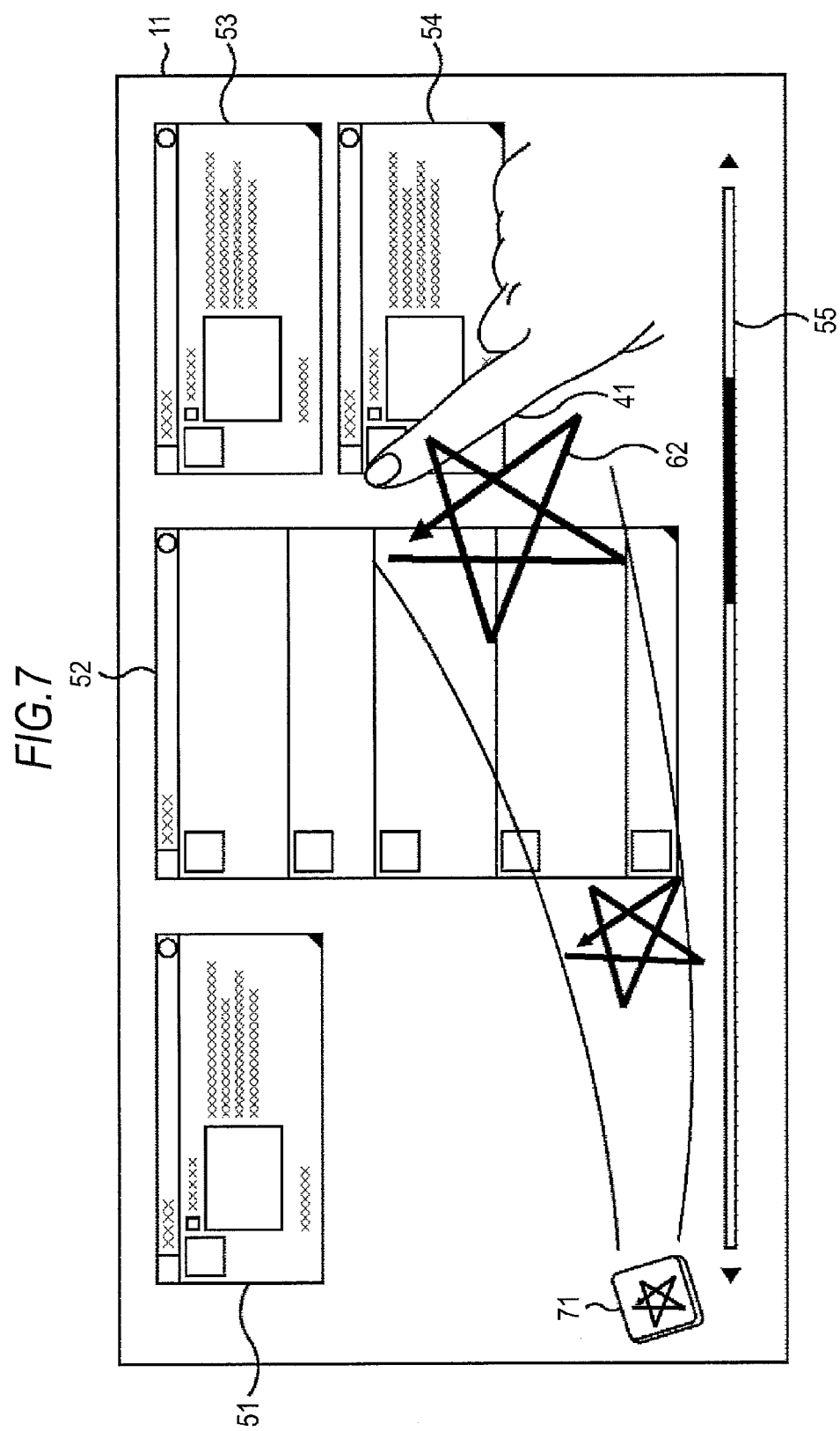
FIG. 7 is a diagram showing a display example when a gesture input process is performed.

In Step S2, the trajectory display unit 34 displays the gesture trajectory detected by the gesture recognition unit 31 in the Step S1 on the display unit 11. For example, as shown in FIG. 7, a star-shaped gesture trajectory 62 is displayed on the display unit 11 by the trajectory display unit 34.

In Step S3, the gesture recognition unit 31 determines whether or not the detected trajectory is a recognizable gesture. When the detected gesture is not a recognizable gesture, it is determined in Step S3 to be NO, and the process progresses to Step S5. For example, in FIG. 7, the gesture trajectory 62 looks like a gesture (star). However, the gesture trajectory 62 is inclined in the left direction compared to the gesture trajectory 61 shown in FIG. 5. For this reason, the gesture recognition unit 31 may not recognize that the gesture trajectory 62 is a gesture (star).

Figure 8:
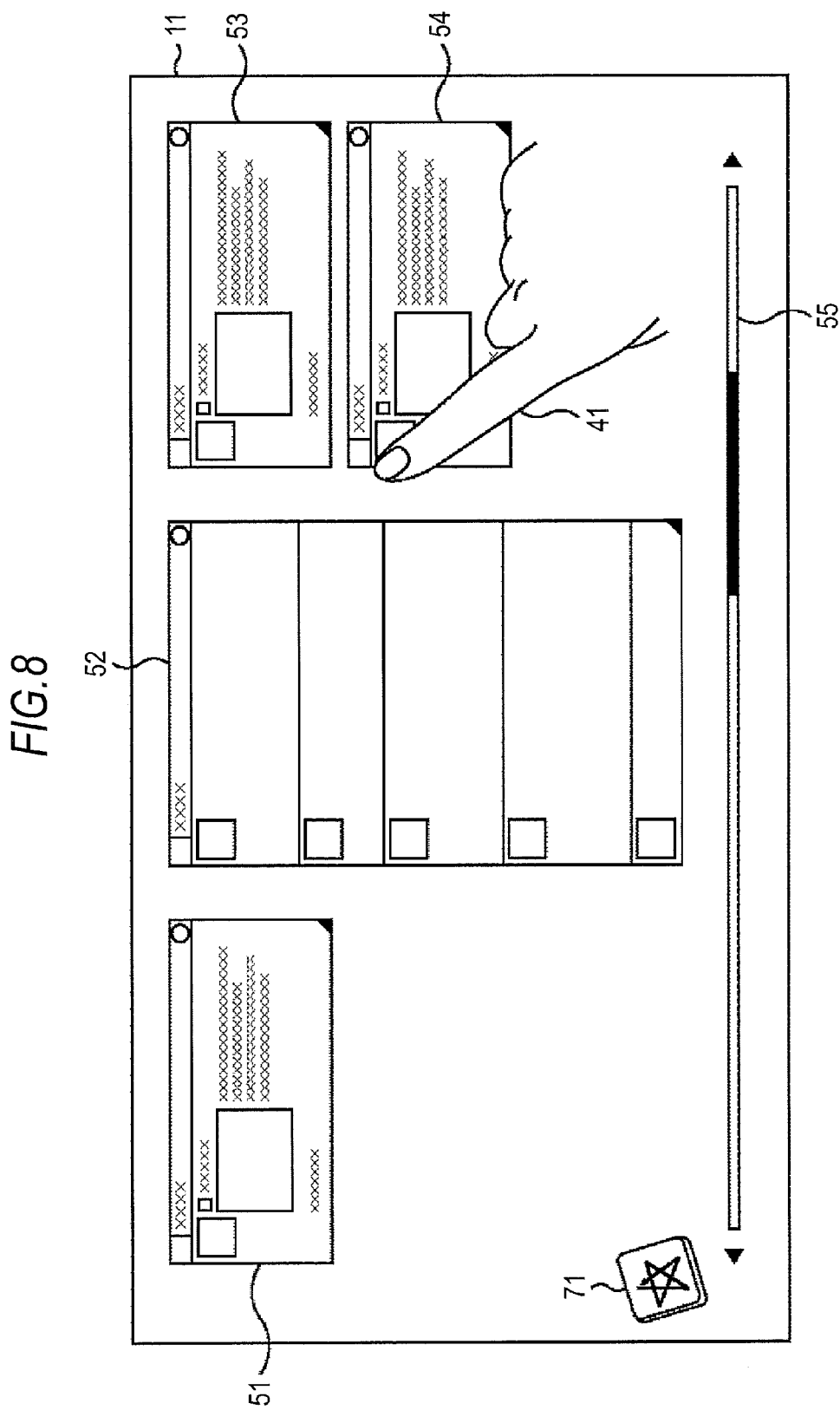
FIG. 8 is a diagram showing a display example when a gesture input process is performed.

In this case, in Step S5, the trajectory display unit 34 displays a reduced trajectory 71. That is, as shown in FIG. 7, the trajectory display unit 34 displays an animation where the gesture trajectory 62 moves in the lower left direction while being reduced in size. As shown in FIG. 8, the trajectory display unit 34 displays the reduced trajectory 71 on the lower left side as an icon.

In this way, the reduced trajectory 71 is displayed, such that the user can know that the gesture input by the user is not recognized (rejected) by the gesture recognition unit 31.

Figure 9:
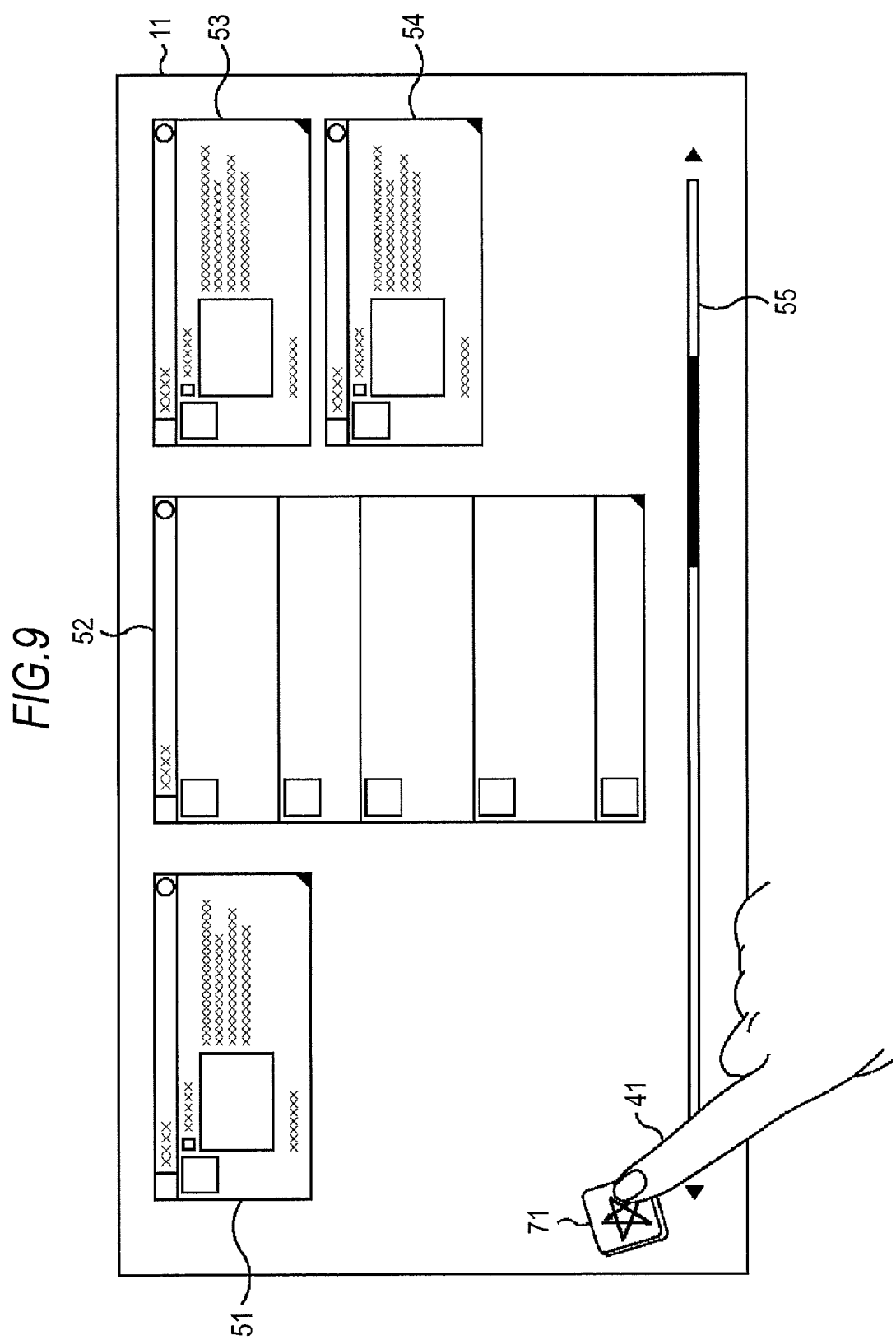
FIG. 9 is a diagram showing a display example when a gesture input process is performed.

Next, in Step S6, the recognition result correction unit 32 determines whether or not the reduced trajectory 71 is tapped. That is, when, from the display of the reduced trajectory 71, the user knows that the input gesture is not recognized, and if input support is requested, the user taps the reduced trajectory 71. Accordingly, as shown in FIG. 9, it is determined that the user taps the reduced trajectory 71 with finger 41.

When the reduced trajectory 71 is tapped with finger 41, it is determined in Step S6 to be YES, and the process progresses to Step S7. In Step S7, the recognition result correction unit 32 displays a recognition correction menu 81. That is, the recognition result correction unit 32 displays the recognition correction menu 81 generated by the correction candidate generation unit 35 on the display unit 11. The recognition correction menu 81 is a menu on which gestures which are recognizable on a screen (in this case, a screen shown in FIG. 9) to which the user inputs a gesture are presented to the user as options in a sequence possibly close to the gesture input by the gesture. When a gesture is unrecognizable by the gesture recognition unit 31, the correction candidate generation unit 35 selects a gesture close to the input trajectory from among inputtable gestures and generates the recognition correction menu 81.

Figure 10:
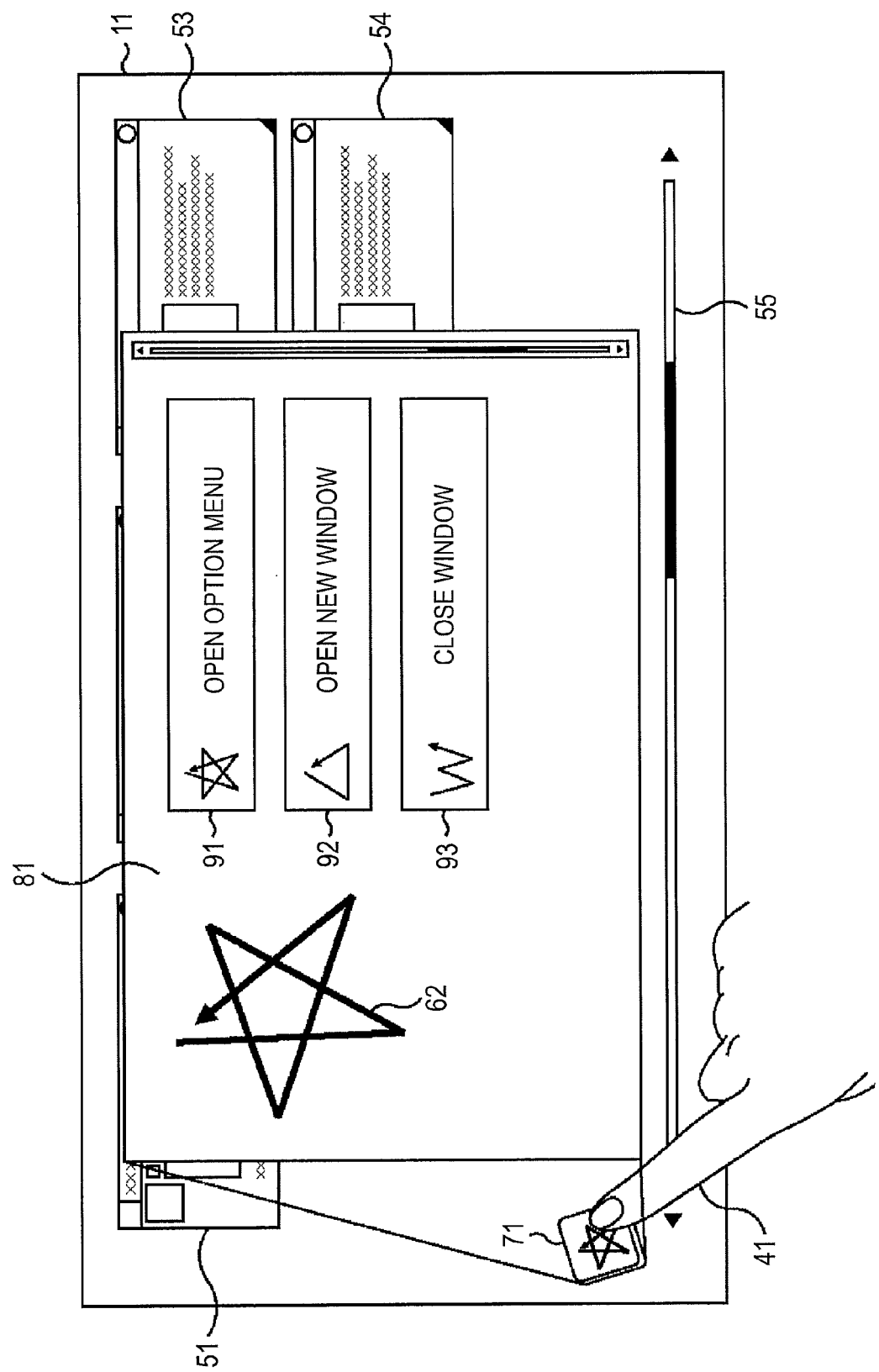
FIG. 10 is a diagram showing a display example when a gesture input process is performed.

Specifically, as shown in FIG. 10, if the trajectory 71 is tapped with finger 41, the recognition correction menu 81 is displayed on the display unit 11. In the recognition correction menu 81, the gesture trajectory 62 input by the user and icons of options 91 to 93 as candidates for a recognizable gesture on the screen are displayed. For example, in the option 91, a gesture (star) and a phrase "open option menu" as the explanation of a process associated with the gesture (star) are displayed. In the option 92, a gesture (hereinafter, referred to a gesture (triangle)) for drawing a triangle with finger 41 and a phrase "open new window" as the explanation of a process associated with the gesture (triangle) are displayed. In the option 93, a gesture (hereinafter, referred to as a gesture (W)) for drawing an alphabetical letter W with finger 41 and a phrase "close window" as the explanation of a process associated with the gesture (W) are displayed.

With the display of these options 91 to 93, the user can confirm a gesture which is intended by the user himself/herself. The user selects any option, that is, an option corresponding to the gesture to be actually input.

In Step S8, the recognition result correction unit 32 detects the selected option. That is, an option tapped with finger 41 from among the options 91 to 93 shown in FIG. 10 is detected.

In Step S9, the gesture recognition unit 31 performs a process associated with the gesture selected in Step S8. That is, for example, when the option 91 from among the options 91 to 93 shown in FIG. 10 is tapped with finger 41, the gesture recognition unit 31 performs a process, "open option menu".

In Step S10, the recognition result correction unit 32 stores correction information. That is, the correction information storage unit 33 stores the gesture trajectory 62 which is the trajectory of the detected gesture in association with the gesture (star) of the selected option 91 as correction information. In this way, the gesture input process ends. The correction information is repeatedly stored in the correction information storage unit 33 each time an unrecognizable gesture is detected. The gesture recognition unit 31 learns a gesture of the user with reference to the stored correction information. Accordingly, for example, when the gesture (star) which is inclined in the left direction is subsequently detected, the gesture is recognized as the gesture (star).

When it is determined in Step S6 to be NO, that is, when the reduced trajectory 71 is not tapped, the process progresses to Step S11.

In Step S11, the recognition result correction unit 32 determines whether or not a given time has elapsed. When the given time has not yet elapsed, it is determined in Step S11 to be NO, and the process progresses to Step S6. That is, the process of Steps S6 to S11 is repeated until the given time elapses or the reduced trajectory is tapped.

Meanwhile, when it is determined in Step S11 that the given time has elapsed, the process progresses to Step S12.

In Step S12, the recognition result correction unit 32 erases the reduced trajectory 71. That is, since the reduced trajectory 71 is not tapped even when the given time has elapsed, the reduced trajectory 71 is determined to be unwanted information for the user, the recognition result correction unit 32 erases the reduced trajectory 71.

The process when it is determined in Step S3 to be NO has been described. Meanwhile, when it is determined in Step S3 to be YES, that is, when the detected gesture is a recognizable gesture, the process progresses to Step S4. In Step S4, the gesture recognition unit 31 performs a process associated with the gesture. That is, when it is determined in Step S3 to be YES, since it is not necessary to correct the gesture, the process of Steps S5 to S12 is not performed.

In this way, if the gesture input process is performed, the user can know that the gesture input by the user is rejected. Since candidates for the gesture are displayed as options, the user can correct the gesture input by the user and can perform the same process as when an intended gesture is correctly input.

Since the trajectory of an input gesture is displayed by the trajectory display unit 34, the user can surmise a reason for the rejection of a gesture, for example, can surmise that, since the display unit 11 is dirty, a gesture is not recognized. Specifically, for example, when a line traced with finger 41 is cut off partway in a gesture trajectory, the user can surmise that, since the display unit 11 is dirty in a portion where the gesture trajectory is cut, the gesture is unrecognizable. Accordingly, the user cleans the display unit 11 such that a gesture can be correctly recognized.

When the gesture recognition unit 31 does not recognize a gesture, while the trajectory display unit 34 displays the reduced trajectory 71, the controller 21 may produce a sound or may vibrate the information processing terminal 1.

Although, if the reduced trajectory 71 is not tapped by the user within a given time, the reduced trajectory 71 is erased, the following configuration may be made. That is, each time different types of gestures are rejected, a new reduced trajectory 71 may be additionally displayed, and if the number of the reduced trajectories 71 to be displayed exceeds an upper limit (for example, three or the like), the reduced trajectory 71 input previously may be erased.

The reduced trajectory 71 is not limited to the display example of FIG. 7. For example, the trajectory display unit 34 may form an animation where the reduced trajectory 71 is floating. It is preferable to provide an impression clearly different from the original display. Therefore, the recognition result correction unit 32 can more effectively request the user to correct an input gesture.

Even when a gesture to be input differs between applications, a gesture and a process associated with the gesture are displayed on the recognition correction menu 81, such that the user can easily correct an input gesture.

In the recognition correction menu 81, an option, such as "new setting" may be provided. If "new setting" is selected, the user may set a new menu corresponding to a gesture (for example, the gesture trajectory 62) input by the user. That is, the user can register a new gesture, which is not registered as a gesture input, in the gesture recognition unit 31.

Second Embodiment

Although in the first embodiment, options are presented to support a gesture input of the user, an inputtable region may be presented to support a gesture input of the user. For example, an inputtable region display function which is a function of displaying a gesture inputtable region when the user inputs a gesture in a region where a gesture is not inputtable or a region, to which a gesture input by the user does not correspond, in the display unit 11 will be described.

The configuration of the information processing terminal 1 is the same as that described with reference to FIGS. 1 to 3.

[Operation of Information Processing Terminal]

Figure 11:
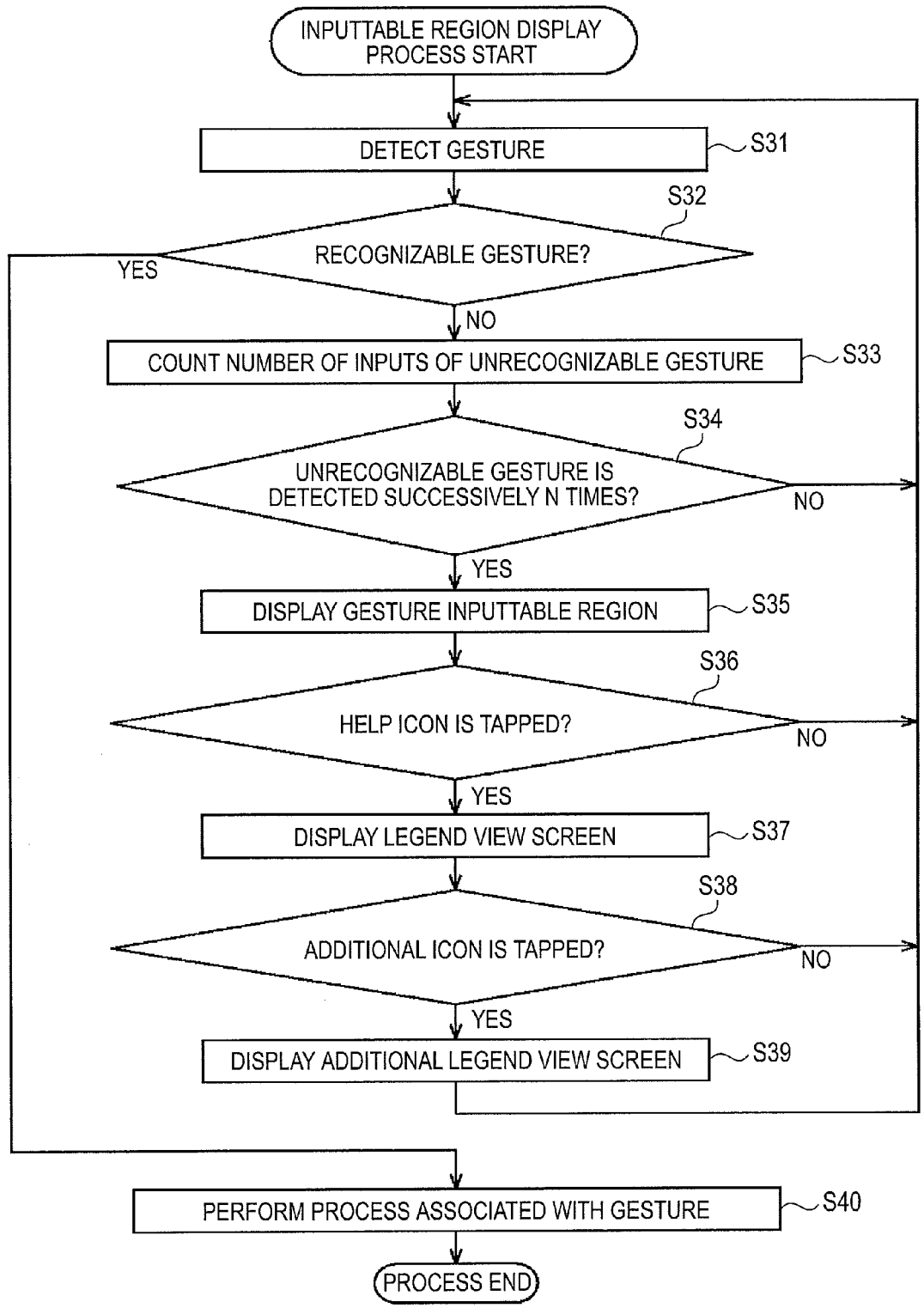
FIG. 11 is a flowchart illustrating an inputtable region display process.

FIG. 11 is a flowchart illustrating an inputtable region display process. The inputtable region display process is a process which is performed by the controller 21 so as to realize the above-described inputtable region display function.

FIGS. 12 to 15 are diagrams showing a display example when the inputtable region display process is performed. Hereinafter, the process of the flowchart of FIG. 11 will be described with reference to FIGS. 4, and 12 to 15.

In Step S31, the gesture recognition unit 31 detects a gesture. Specifically, in FIG. 4, the gesture recognition unit 31 detects a gesture input to the display unit 11 with finger 41.

In Step S32, the gesture recognition unit 31 determines whether or not the detected gesture is a recognizable gesture. When the detected gesture is not a recognizable gesture, it is determined in Step S32 to be NO, and the process progresses to Step S33. Specifically, for example, when a tap input is performed with finger 41 in a region where there is no process associated with the tap input, it is determined in Step S32 to be NO.

In Step S33, the recognition result correction unit 32 counts the number of inputs of an unrecognizable gesture. For example, the number of times of a tap input with finger 41 in a region where there is no process associated with the tap input is counted.

In Step S34, the recognition result correction unit 32 determines whether or not an unrecognizable gesture is counted successively N times. N is an arbitrary integer. When it is determined in Step S34 to be NO, that is, when an unrecognizable gesture is not yet detected successively N times, the process returns to Step S31. In other words, the process of Steps S31 to S34 is repeated until an unrecognizable gesture is detected successively N times insofar as a recognizable gesture is not detected (the process of Step S32). When an unrecognizable gesture is detected successively N times, it is determined in Step S34 to be YES, and the process progresses to Step S35.

In Step S35, the recognition result correction unit 32 displays gesture inputtable regions 121 to 124. That is, the correction candidate generation unit 35 detects a gesture inputtable region where a gesture is inputtable at a predetermined time for each screen. In the example of FIG. 12, the gesture inputtable regions 121 to 124 are detected. The recognition result correction unit 32 displays the gesture inputtable regions 121 to 124 on the display unit 11 on the basis of the detection result. The gesture inputtable regions 121 to 124 are represented such that filters in different colors are superimposed on the original display screen. In other words, the gesture inputtable regions 121 to 124 allow the user to visually recognize the inputtable regions while the original display screen (for example, letters, figures, and the like) can be visually recognized.

For example, the gesture inputtable region 121 is a region where a tap input is possible with a range shown in the drawing. The gesture inputtable region 122 is a region where a flick (hereinafter, referred to as vertical flick) input in the vertical direction is possible within a range shown in the drawing. The gesture inputtable region 123 is a region where a flick (hereinafter, referred to as horizontal flick) in the horizontal direction is possible within a range shown in the drawing. The gesture inputtable region 124 is a region where the user continues to touch the touch panel 25 with finger 41 for a given time, that is, long press is possible. The user can know the type and position of an inputtable gesture from the color and position of each region.

Next, in Step S36, the recognition result correction unit 32 determines whether or not a help icon 101 is tapped. That is, as shown in FIG. 13, when the help icon 101 is tapped with finger 41, it is determined in Step S36 to be YES, and the process progresses to Step S37.

In Step S37, the recognition result correction unit 32 displays a legend view screen 131. That is, the correction candidate generation unit 35 generates an image which is displayed when a predetermined region is operated for each screen. The legend view screen 131 shown in FIG. 14 is generated in response to the held icon 101. Accordingly, the recognition result correction unit 32 displays the legend view screen 131 on the display unit 11.

As shown in FIG. 14, the legend view screen 131 is a screen on which inputtable gestures corresponding to regions represented by the gesture inputtable regions 121 to 124 are displayed. As described above, for example, since the gesture inputtable region is a region where a tap input is possible, on the legend view screen 131, a color 121A of the gesture inputtable region 121 is illustrated, and the letters "tap" are displayed in response to the color 121A. Similarly, on the legend view screen 131, colors 122A to 124A of the gesture inputtable regions 122 to 124 are illustrated, and the letters "vertical flick", "horizontal flick", and "long press" are displayed in response to the colors 122A to 124A.

In this way, the user can view the legend view screen 131 and can understand a gesture which is inputtable in each of the gesture inputtable regions 121 to 124.

On the legend view screen 131, an additional icon 125 which is operated to display complementary information is displayed. The additional icon 125 is an icon to be tapped, and is displayed in the same color 121A as the gesture inputtable region 121.

In Step S38, the recognition result correction unit 32 determines whether or not the additional icon 125 is tapped. That is, as shown in FIG. 15, when the additional icon 125 is tapped with the finger 41, it is determined in Step S38 to be YES, and the process progresses to Step S39.

In Step S39, the recognition result correction unit 32 displays an additional legend view screen 141. That is, as described above, the correction candidate generation unit 35 generates the additional legend view screen 141 as a display image when the additional icon 125 is tapped. The recognition result correction unit 32 displays the additional legend view screen 141 on the display unit 11. The process then returns to Step S31.

As shown in FIG. 15, the additional legend view screen 141 is a screen on which a recognizable gesture on a current display screen is displayed. Specifically, on the additional legend view screen 141, a gesture (hereinafter, referred to as a gesture (right rotation)) for drawing a circle in the clockwise direction with the finger 41 and the letters "right rotation" as a process associated with the gesture (right rotation) are displayed. The term "right rotation" refers to a process for rotating a figure or the like toward the right. For example, a gesture (hereinafter, referred to as a gesture (left rotation)) for drawing a circle in the counterclockwise direction with the finger 41 and the letters "left rotation" as a process associated with the gesture (left rotation) are displayed. The term "left rotation" refers to, for example, a process for rotating a figure or the like towards the left. On the additional legend view screen 141, the gesture (star), the gesture (triangle), and the gesture (W) described with reference to FIG. 10 are also displayed in association with the letters "open option menu", "open new window", and "close window".

The user can know more inputtable gestures as complementary information with reference to the additional legend view screen 141.

When it is determined in Step S36 to be NO, that is, when the user does not tap the help icon 101, the user does not need the legend view screen 131. Accordingly, the process returns to Step S31. Similarly, when it is determined in Step S38 to be NO, that is, when the user does not tap the additional icon 125, the user does not need the additional legend view screen 141, thus the process returns to Step S31.

A case where it is determined in Step S32 to be NO has been described. Meanwhile, when it is determined in Step S32 to be YES, that is, when the detected gesture is a recognizable gesture, the process progresses to Step S40. That is, when it is determined in Step S32 to be YES, it is not necessary to display the gesture inputtable regions 121 to 124, thus the process of Steps S33 to S39 is not performed.

In Step S40, the gesture recognition unit 31 performs a process associated with a gesture. That is, when an unrecognizable gesture is detected successively N times (the process of Step S34), the gesture inputtable regions 121 to 124 are displayed (the process of Step S35), or the legend view screen 131 or the additional legend view screen 141 is displayed (the process of Step S37 or S39). In reference to the display, if the user can input a recognizable gesture (the process of Step S31 and S32), the process progresses to Step S40, and the gesture recognition unit 31 can perform a process associated with the gesture.

In this way, if the inputtable region display process is performed, it becomes possible for the user to visually recognize a gesture inputtable region on the screen in association with an inputtable gesture. Therefore, the user can efficiently correct a gesture input by the user and can perform an intended process.

Even when a gesture input or an inputtable region differs between applications, an inputtable region corresponding to a gesture input is displayed on the legend view screen 131, such that the user can easily correct an input gesture.

A sequence of processes described above may be performed by hardware or may be performed by software. When a sequence of processes is performed by software, a program constituting software is installed on a computer. Examples of the computer include a computer which is incorporated in the information processing terminal 1 as dedicated hardware, a general-purpose personal computer in which various programs are installed to perform various functions, and the like.

When the storage unit 26 is constituted by a removable medium, such as a package medium, a program which is executed by a computer (controller 21) may be recorded in the removable medium and provided. The program may be provided through a wired or wireless transmission medium, such as a Local Area Network, Internet, or digital satellite broadcasting.

The program which is executed by a computer may be a program in which a process is performed in time series in a sequence described in this specification, or a program in which a program is performed in parallel or at a necessary timing when a call is made.

The embodiments of the present technology are not limited to the above-described embodiments, and various changes may be made without departing from the spirit and scope of the present technology.

The present technology may have the following configuration.

(1) A device comprising:
a display unit displays display screens;
an input unit receives a gesture input;
a controller detects whether a gesture, input on said input unit, is in a gesture input region where gesture input is accepted on one of the display screens of the display unit, and displays gesture input regions for the display screen when the gesture is not detected in the gesture input region.

(2) The device according to (1), wherein the controller determines a number of successive times the gesture is input on the input unit in non-gesture input regions where gesture recognition is not associated with any gesture.

(3) The device according to (2), wherein the controller displays the gesture input regions when the number of successive times the gesture is input in the non-gesture input regions is greater than a predetermined value.

(4) The device according to (1) or (2), wherein the gesture input regions are displayed superimposed on the display screen while the display screen remains visible.

(5) The device according to (4), wherein the gesture input regions are displayed superimposed on the display screen using different colors.

(6) The device according to any of (1), (2) or (4), wherein the controller determines if additional information about the gesture input regions is requested.

(7) The device according to (6), wherein when additional information about the gesture input regions is requested, the controller displays a legend screen which displays an explanation about types of input gestures associated with each gesture input region.

(8) The device according to (7), wherein if further additional information about the legend screen is requested, the controller displays an additional legend screen displaying recognizable gestures and explanations thereof.

(9) A method comprising the steps of:
detecting whether a gesture, input on an input unit, is in a gesture input region where gesture input is accepted on a display screen of a display unit; and
displaying gesture input regions for the display screen when the gesture is not detected in the gesture input region.

(10) The method according to (9), further comprising determining a number of successive times the gesture is input on the input unit in non-gesture input regions where gesture recognition is not associated with any gesture.

(11) The method according to (10), further comprising displaying the gesture input regions when the number of successive times the gesture is input in the non-gesture input regions is greater than a predetermined value.

(12) The method according to (9) or (10), further comprising displaying the gesture input regions superimposed on the display screen while the display screen remains visible.

(13) The method according to (12), further comprising displaying the gesture input region superimposed on the display screen using different colors.

(14) The method according to any of (9), (10) or (12), further comprising determining if additional information about the gesture input regions is requested.

(15) The method according to (14), further comprising when additional information about the gesture input regions is requested, displaying a legend screen which displays an explanation about types of input gestures associated with each gesture input region.

(16) The method according to (15), further comprising when further additional information about the legend screen is requested, displaying an additional legend screen displaying recognizable gestures and explanations thereof.

(17) A program, embodied on a non-transitory computer readable medium, executed on a computer for determining gestures comprising the steps of:
detecting whether a gesture, input on an input unit, is in a gesture input region where gesture input is accepted on a display screen of a display unit; and
displaying gesture input regions for the display screen when the gesture is not detected in the gesture input region.

(18) A non-transitory computer-readable recording medium for controlling a controller to determine gestures comprising the steps of:
detecting whether a gesture, input on an input unit, is in a gesture input region where gesture input is accepted on a display screen of a display unit; and displaying gesture input regions for the display screen when the gesture is not detected in the gesture input region.

The present technology may also have the following configuration.

(1) An information processing terminal includes an input unit which receives a gesture input, a recognition unit which recognizes the gesture input to the input unit, and a display unit which, when the gesture is input in a non-inputtable region, displays inputtable region information representing a region where the gesture is inputtable on a screen to which the gesture is input.

(2) In the information processing terminal described in (1), when the gesture is input a predetermined number of times in the non-inputtable region, the display unit displays the inputtable region information.

(3) In the information processing terminal described in (2), the display unit displays the region where the gesture is inputtable in association with the type of inputtable gesture as the inputtable region information.

(4) In the information processing terminal described in any one of (1) to (3), when the inputtable region information is displayed, the display unit displays the inputtable region in a color corresponding to the type of inputtable gesture.

(5) In the information processing terminal described in any one of (1) to (4), the inputtable region information includes information explaining the type of inputtable gesture as complementary information in response to the display of the inputtable region, and the display unit further displays the complementary information in accordance with a user instruction.

(6) In the information processing terminal described in any one of (1) to (5), the complementary information includes information explaining the inputtable gesture on the screen to which the gesture is input.

(7) An information processing method includes receiving a gesture input, recognizing the input gesture, and when the gesture is input in a non-inputtable region, displaying inputtable region information representing a region where the gesture is inputtable on a screen to which the gesture is input.

(8) A program causes a computer to execute receiving a gesture input, recognizing the input gesture, and when the gesture is input in a non-inputtable region, displaying inputtable region information representing a region where the gesture is inputtable on a screen to which the gesture is input.

(9) A computer-readable recording medium has recorded therein a program which causes a computer to execute receiving a gesture input, recognizing the input gesture, and when the gesture is input in a non-inputtable region, displaying inputtable region information representing a region where the gesture is inputtable on a screen to which the gesture is input.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1: information processing terminal
11: display unit
12: operation unit
21: controller
22: sensor unit
23: camera
24: communication unit
31: gesture recognition unit
32: recognition result correction unit
33: correction information storage unit
34: trajectory display unit
35: correction candidate generation unit

What is claimed is:

1. An information processing apparatus comprising:
a controller controlling a display unit, the controller being configured to receive and recognize a gesture input on a screen of the display unit,
wherein, when a first gesture for performing a first input process has been input a predetermined number of times in a region of the screen where no process is associated with the first gesture, the controller controls the display unit to display a region of the screen where it is possible to perform the first input process by using a second gesture and display information explaining the second gesture on the screen.

2. The information processing apparatus according to claim 1, wherein the second gesture is different from the first gesture.

3. The information processing apparatus according to claim 2, wherein the first gesture is a tap operation.

4. The information processing apparatus according to claim 3, wherein the second gesture is an operation of moving a finger in an arbitrary direction on the screen.

5. The information processing apparatus according to claim 1, wherein the first gesture is a tap operation.

6. The information processing apparatus according to claim 1, wherein the second gesture is an operation of moving a finger in an arbitrary direction on the screen.

7. The information processing apparatus according to claim 1, wherein the information explaining the second gesture includes text information.

8. The information processing apparatus according to claim 1, wherein the information explaining the second gesture includes a type of the second gesture and information regarding the first input process.

9. The information processing apparatus according to claim 1, wherein the region where it is possible to perform the first input process by using the second gesture is displayed in color.

10. The information processing apparatus according to claim 1, further comprising a communication unit that communicates information, wherein the display unit displays a web page received by the communication unit.

11. The information processing apparatus according to claim 1, further comprising a touch panel on an upper surface of the display unit.

12. An information processing method comprising:
an input step of receiving a gesture input on a screen;
a recognition step of recognizing the gesture input; and
a display control step of, when a first gesture for performing a first input process has been input a predetermined number of times in a region of the screen where no process is associated with the first gesture, displaying a region of the screen where it is possible to perform the first input process by using a second gesture and displaying information explaining the second gesture on the screen.

13. A non-transitory computer-readable recording medium storing a program for causing a computer to execute:
an input step of receiving a gesture input on a screen;
a recognition step of recognizing the gesture input; and
a display control step of, when a first gesture for performing a first input process has been input a predetermined number of times in a region of the screen where no process is associated with the first gesture, displaying a region of the screen where it is possible to perform the first input process by using a second gesture and displaying information explaining the second gesture on the screen.

* * * * *